United States Patent
Weyerhaeuser et al.

(10) Patent No.: US 10,241,961 B2
(45) Date of Patent: Mar. 26, 2019

(54) AUGMENTED QUERY OPTIMIZATION BY DATA FLOW GRAPH MODEL OPTIMIZER

(75) Inventors: Christoph Weyerhaeuser, Heidelberg (DE); Tobias Mindnich, Walldorf (DE); Daniel Baeumges, Viersen (DE); Gerrit Simon Kazmaier, Heidelberg (DE)

(73) Assignee: SAP SE, Walldorf (DE)

( * ) Notice: Subject to any disclaimer, the term of this patent is extended or adjusted under 35 U.S.C. 154(b) by 814 days.

(21) Appl. No.: 13/457,341

(22) Filed: Apr. 26, 2012

(65) Prior Publication Data
US 2013/0290292 A1    Oct. 31, 2013

(51) Int. Cl.
*G06F 17/30* (2006.01)
*G06F 16/2453* (2019.01)

(52) U.S. Cl.
CPC .............. *G06F 16/24542* (2019.01)

(58) Field of Classification Search
CPC ................................. G06F 17/30463
See application file for complete search history.

(56) References Cited

U.S. PATENT DOCUMENTS

| | | |
|---|---|---|
| 6,484,162 B1 | 11/2002 | Edlund et al. |
| 6,618,719 B1 | 9/2003 | Andrei |
| 2003/0182276 A1* | 9/2003 | Bossman et al. .................. 707/3 |
| 2006/0167865 A1* | 7/2006 | Andrei .............. G06F 17/30466 |
| 2006/0167869 A1* | 7/2006 | Jones ................................. 707/4 |
| 2006/0212418 A1 | 9/2006 | Dettinger et al. |
| 2006/0248046 A1* | 11/2006 | Galindo-Legaria .......................... G06F 17/30474 |
| 2008/0027788 A1* | 1/2008 | Lawrence .............. G06Q 30/02 705/7.33 |
| 2009/0006301 A1* | 1/2009 | Goetsch et al. ................. 706/47 |
| 2010/0306188 A1 | 12/2010 | Cunningham et al. |

OTHER PUBLICATIONS

Bizarro, Pedro et al., "Progressive Parametric Query Optimization", IEEE Transactions on Knowledge and Data Engineering, vol. 21, No. 4, Apr. 1, 2009.
Martinez-Medina, Lurdes Angelica et al., "Query optimization using case-based reasoning in ubiquitous environments", 2009 Mexican International Conference on Computer Science (ENC), Sep. 21, 2009.
European Search Report and Written Opinion dated Mar. 5, 2012, issued by the European Patent Office in connection with corresponding EP Application No. 11004965.7.

* cited by examiner

*Primary Examiner* — Paul Kim
(74) *Attorney, Agent, or Firm* — Mintz Levin Cohn Ferris Glovsky and Popeo, P.C.; Paul Brockland; F. Jason Far-hadian

(57) ABSTRACT

A query is received, and in response, an initial data flow graph is generated that includes a plurality of nodes for executing the query with at least one of the nodes having at least one associated hint. The initial data flow graph is subsequently optimized using a model optimizer having a rules engine using a plurality rules to optimize the initial data flow graph. The at least one associated hint is used by the model optimizer to change how at least one of the plurality of rules is applied. Thereafter, execution of the query is initiated using the optimized data flow graph. Related apparatus, systems, techniques and articles are also described.

19 Claims, 9 Drawing Sheets

AUGMENTED QUERY OPTIMIZATION BY DATA FLOW GRAPH MODEL OPTIMIZER

TECHNICAL FIELD

The subject matter described herein relates to augmented query optimization by an optimizer for a data flow graph. In particular, an initial data flow graph having nodes with hints can be optimized by the optimizer such that the application of rules by the model optimizer can be changed by the hints.

BACKGROUND

Data flow graphs comprise a plurality of nodes that define how a query is to be executed. For a given data flow graph and its nodes, rules implemented by optimizers can be used to decided whether an optimization can be applied on a node or a sequence of nodes (i.e., whether the data flow graph can be modified in order to provide better performance). With conventional optimizers, heavy weighted rules and complex detection patterns must be adopted in order to optimize a data flow graph that takes into account various business semantics. These requirements are especially required when the nodes of the data flow graph contain domain specific language coding. Moreover, with domain specific language coding, the optimizer can require a parser for each domain specific language used in the data flow graph and must be aware of the semantic that is expressed with the domain specific language coding.

SUMMARY

In one aspect, a query is received, and in response, an initial data flow graph is generated that includes a plurality of nodes for executing the query with at least one of the nodes having at least one associated hint. The initial data flow graph is subsequently optimized using a model optimizer having a rules engine using a plurality rules to optimize the initial data flow graph. The at least one associated hint is used by the model optimizer to change how at least one of the plurality of rules is applied. Thereafter, execution of the query is initiated using the optimized data flow graph.

The at least one hint can override one or more disqualification facts that would prevent a corresponding rule from being applied by the model optimizer. In addition, or in the alternative, the at least one hint can specify rules to be applied to at least a portion of the constellation of nodes (i.e., a subset of the nodes of the data flow graph or, in some cases, the entire set of nodes, etc.) that would not otherwise be applied by the model optimizer. The at least one associated hint comprises metadata associated with a corresponding node. The metadata can be specified via user-generated input via a graphical user interface.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the optimizer allows for optimizations based on a business semantic without implementing complex business logic into the optimizer that wholly characterizes the business semantic. More specifically, the current subject matter is advantageous in that a modeler can annotate nodes with hints to provide certain functionality that would otherwise require pattern detection algorithms and parsing logic that require significant processing resources and/or time.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
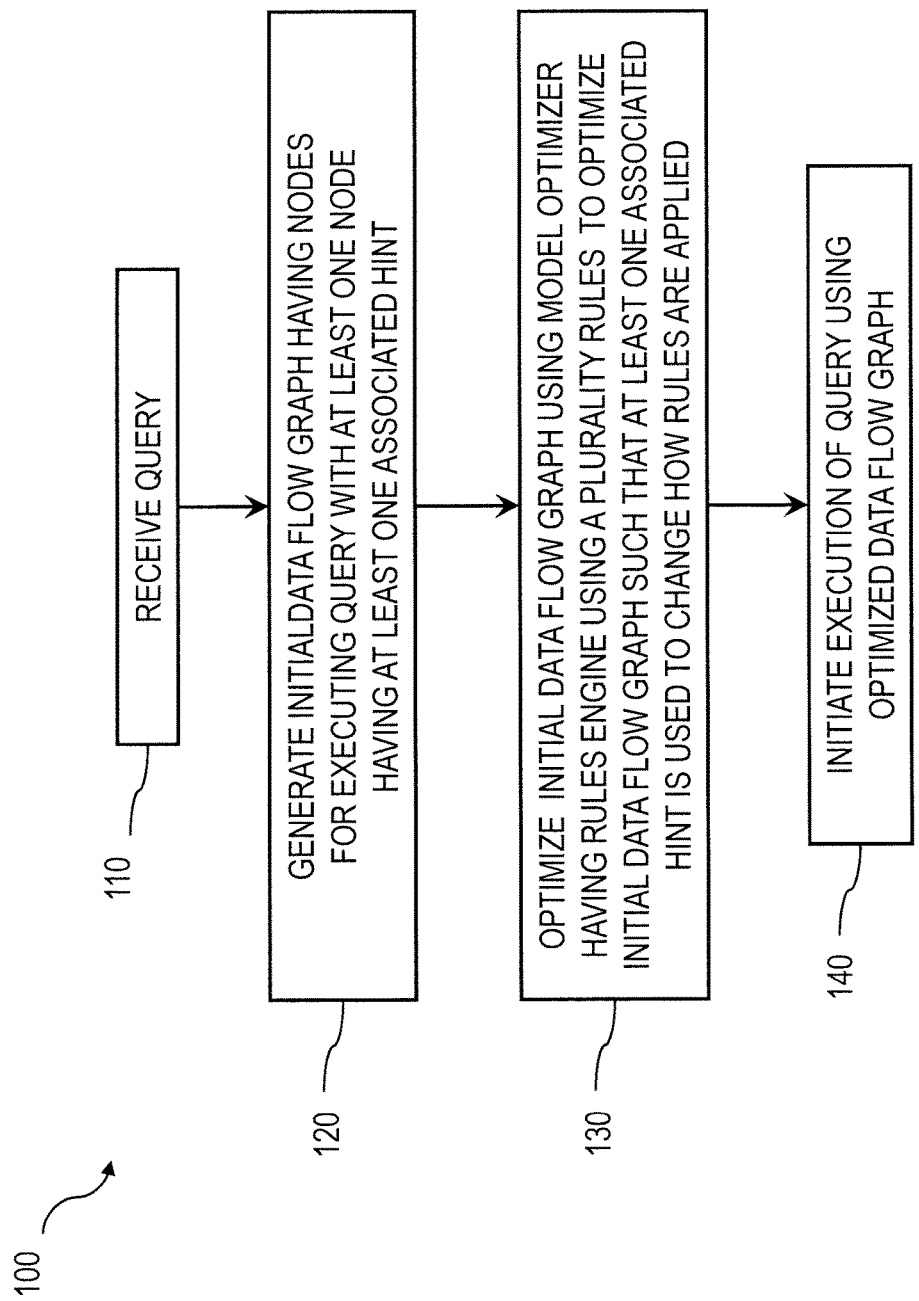
FIG. 1 is a process flow diagram illustrating a method of augmenting query optimization.

FIG. 1 is a process flow diagram 100 illustrating a method in which, at 110, a query is received. Thereafter, at 120, an initial data flow graph comprising a plurality of nodes for executing the query is generated with at least one of the nodes having at least one associated hint. Afterwards, at 130, the initial data flow graph is optimized using a model optimizer that has a rules engine using a plurality rules to optimize the initial data flow graph. The at least one associated hint is used, by the model optimizer, to change how at least one of the plurality of rules is applied. Execution of the query using the optimized data flow graph is then, at 140, is initiated.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

Figure 2:
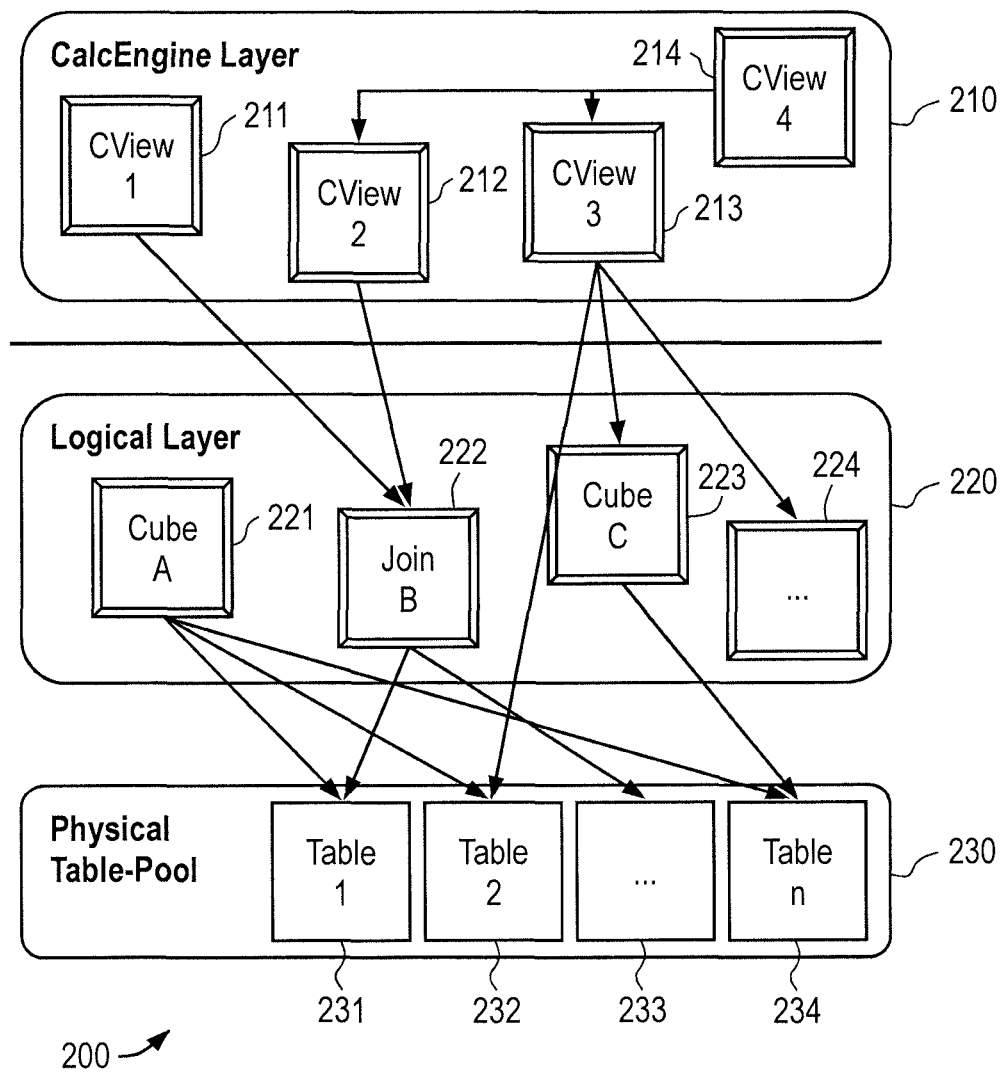
FIG. 2 is a diagram illustrating a calculation engine layer, a logical layer, a physical table pool and their interrelationship.

The current subject matter can be implemented, for example, in connection with a calculation engine environment such as that illustrated in the diagram 200 of FIG. 2. In FIG. 2, illustrated are a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP index) can be assigned roles (e.g., fact or dimension tables) and joined to form a star schema. It is also possible to form join indexes, which can act like database view in environments such as the Fast Search Infrastructure (FSI) by SAP AG.

Calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP indexes or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. Example environments for implementing calculation scenarios can be found, for example, in U.S. patent application Ser. No. 12/914,445, the contents of which are hereby fully incorporated by reference.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Figure 3:
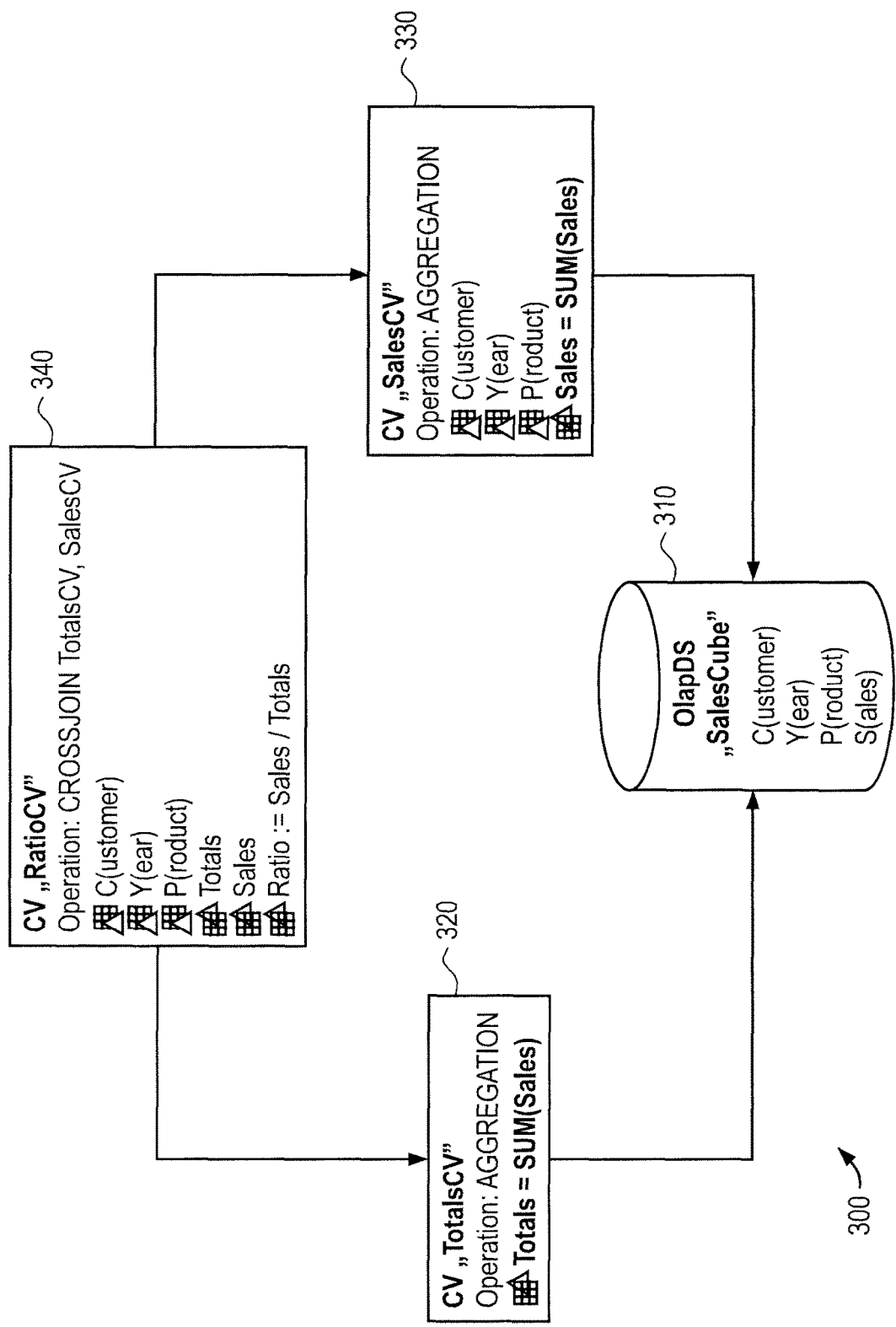
FIG. 3 is a diagram illustrating a first instantiation of a calculation scenario.

FIG. 3 is a diagram 300 illustrating an example of a calculation scenario that relates a number of sales to total sales. With conventional arrangements, such a query can be expressed with several SQL statements but not in a single statement, because for the calculation of the relation two aggregations at different aggregation levels are required. To calculate the number of sales, aggregation is performed by a requested GroupBy attribute. To calculate the sales total, all sales need to be aggregated. Previously this required two separate requests on different SQL view, and the final calculation had to be performed in the application (as opposed to database-side).

For this example, that data source is an OLAP cube "SalesCube" 330, which has the three dimensions Customer, Year, and Product as well as the measure Sales. As stated, this data source 310 can be entered as a special DataSource node in the logical layer 220 in the calculation scenario. The DataSource is now referenced from two calculation nodes. The calculation node TotalsCV 320 on the left side calculates the sales total, by simply summing the sales without any GroupBy attributes. The calculation node SalesCV 330 on the right side calculates the sales according to the GroupBys. To calculate their relationship, the two calculation nodes 320, 330 are joined with each other using a CrossJoin. In the calculation node RatioCV 340 after the join, all the attributes needed for the calculation are available and a new calculated attribute Ratio is provided.

Figure 4:
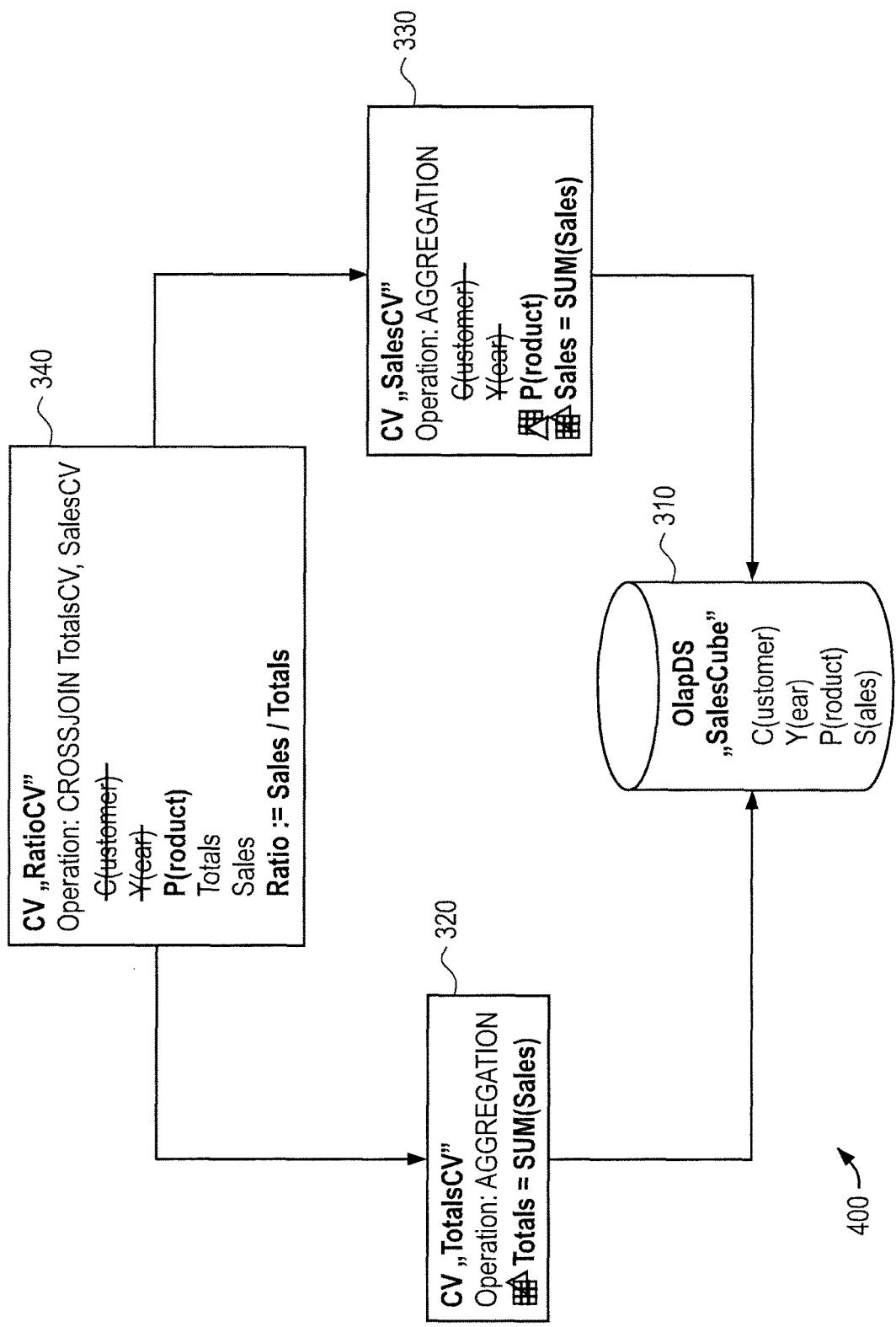
FIG. 4 is a diagram illustrating a second instantiation of a calculation scenario.

The implementation of FIG. 3 is a general calculation scenario. That is, if the calculation scenario is queried via a SQL statement which only requests product as GroupBy attribute, the model is appropriately instantiated and executed. FIG. 4 is a diagram 400 illustrating a variation in which not all of the attributes specified by the calculation nodes 330, 340 are required. In particular, the ratio calculation is for sales relative to total sales without regard to customer and year. In the instantiation, the unnecessary attributes Customer and Year are removed from the calculation nodes RatioCv 340 and SalesCV 330 which accelerates execution of the results (e.g., the ratio) because less data has to be touched (i.e., fewer attributes need to be searched/persisted, etc.).

Figure 5:
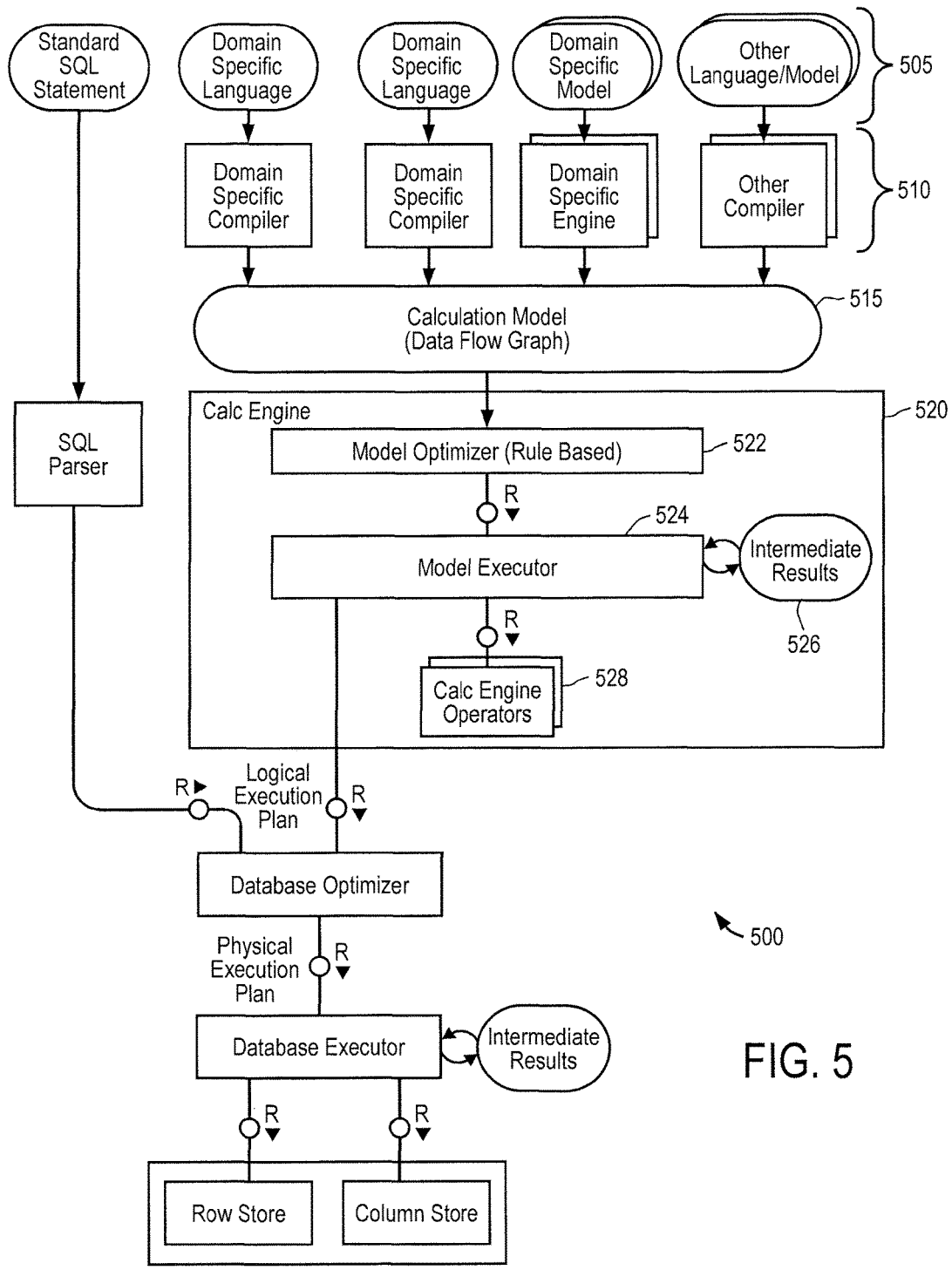
FIG. 5 is a diagram illustrating an architecture for processing and execution control.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 515 (illustrated as a calculation model). To achieve enhanced performance, the models and programs written in these languages are executed inside the database server. This arrangement eliminates the need to transfer large amounts of data between the database server and the client application. Once the different artifacts 505 are compiled into this calculation scenario 515, they can be processed and executed in the same manner. The execution of the calculation scenarios 515 (i.e., data flow graphs) is the task of a calculation engine 520.

The calculation scenario 515 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 515 can be defined as part of database metadata and invoked multiple times. A calculation scenario 515 can be created, for example, by a SQL statement "ALTER SYSTEM ADD SCENARIO <xml OR json representing the scenario>". Once a calculation scenario 515 is created, it can be queried (e.g., "SELECT A, B, C FROM <scenario name>", etc.). In some cases, databases can have pre-defined calculation scenarios 515 (default, previously defined by users, etc.). The calculation scenarios 515 can be persisted in a repository (coupled to the database server) or in transient scenarios, the calculation scenarios 515 can be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

The data flow graph (i.e., calculation scenario, etc.) can be enriched with so called hints that allow the model optimizer 522 to do optimization steps that could lead to wrong results or wrong optimizations if they would be applied in general to a data flow graph. With the current subject matter, the designer of the data flow graph model can set those hints with respect to the business logic behind the model. In some implementations, multiple hints can be combined on a single node.

The model optimizer 522 can detect the semantic of standard operations such as projections and is able, based on the pattern detection logic that is implemented, to push a filter down. Such optimizations are sometimes referred to as standard optimizations. In addition, the model optimizer 522 can enrich the data flow graph with hints on one or multiple nodes that indicates that a concrete optimization can be applied (e.g. PUSH_FILTER_TO_SUCCESSOR_NODE). Such optimizations are sometimes referred to as enhanced optimizations. An example model optimizer is found in co-pending application Ser. No. 13/457,330 filed on Apr. 26, 2012, the contents of which are hereby incorporated by reference.

The model optimizer 522 can implement a variety of hints. With standard optimizations, there are certain circumstances that prevent it from being applied. For example, a standard optimization might specify that a filter cannot be pushed down because the lower node has multiple consumers. By pushing the filter down, the data that all consuming nodes will receive would be influenced according to the filter. From the perspective of the business logic behind the data flow graph, it might be correct to push the filter down in such a situation. In such a case, an optimizer hint like IGNORE_MULTIPLE_OUTPUTS can be used that allows the model optimizer 522 to ignore one or multiple disqualification facts so that a rule can be applied anyway. Stated differently, the optimizer hint can be used to override one or more pre-existing rules.

In addition, hints can be used to guide the model optimizer 522 in a way so that a formerly unoptimizable constellation/hierarchy of nodes in the data flow graph can easily be optimized (enhanced optimizations e.g. PUSH_FILTER_TO_SUCCESSOR_NODE).

Figure 6:
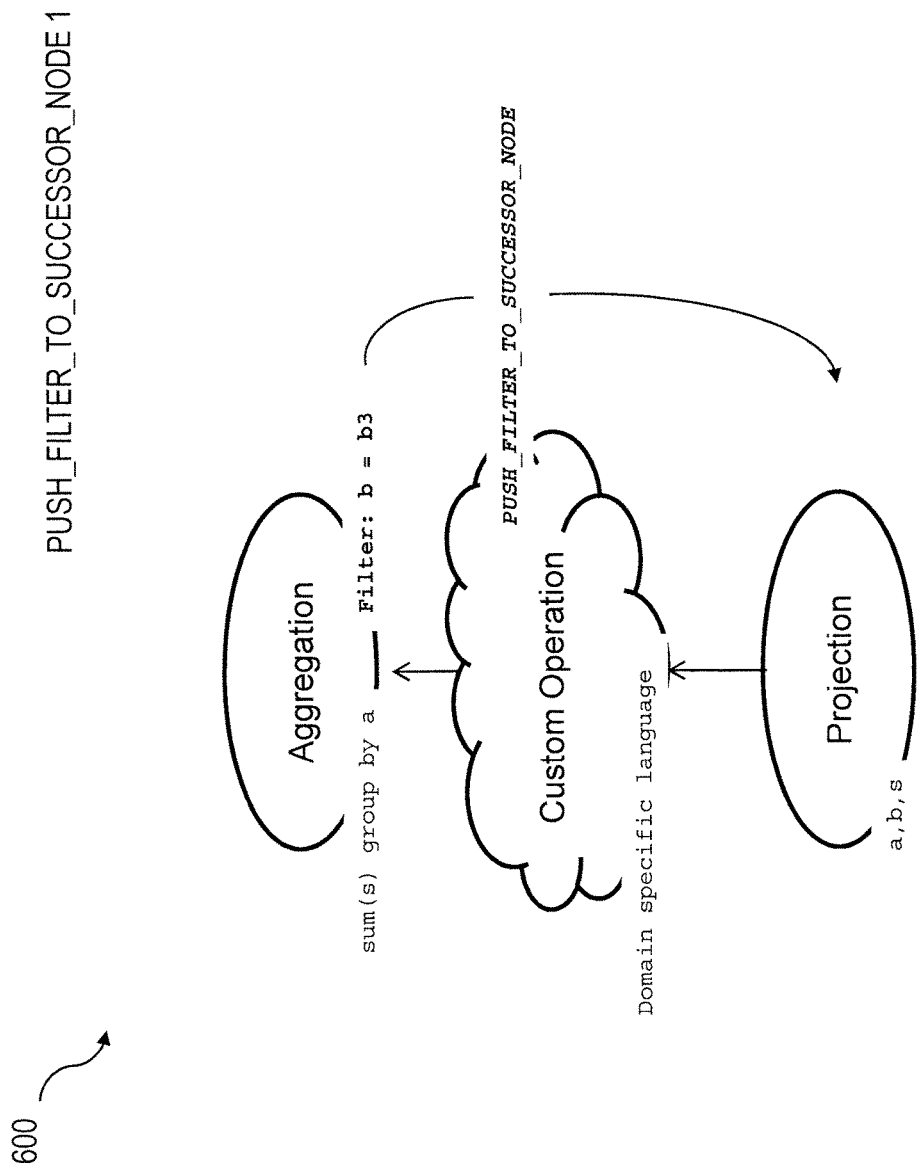
FIGS. 6-9 illustrate various data flow graphs having nodes with hints.
Figure 7:
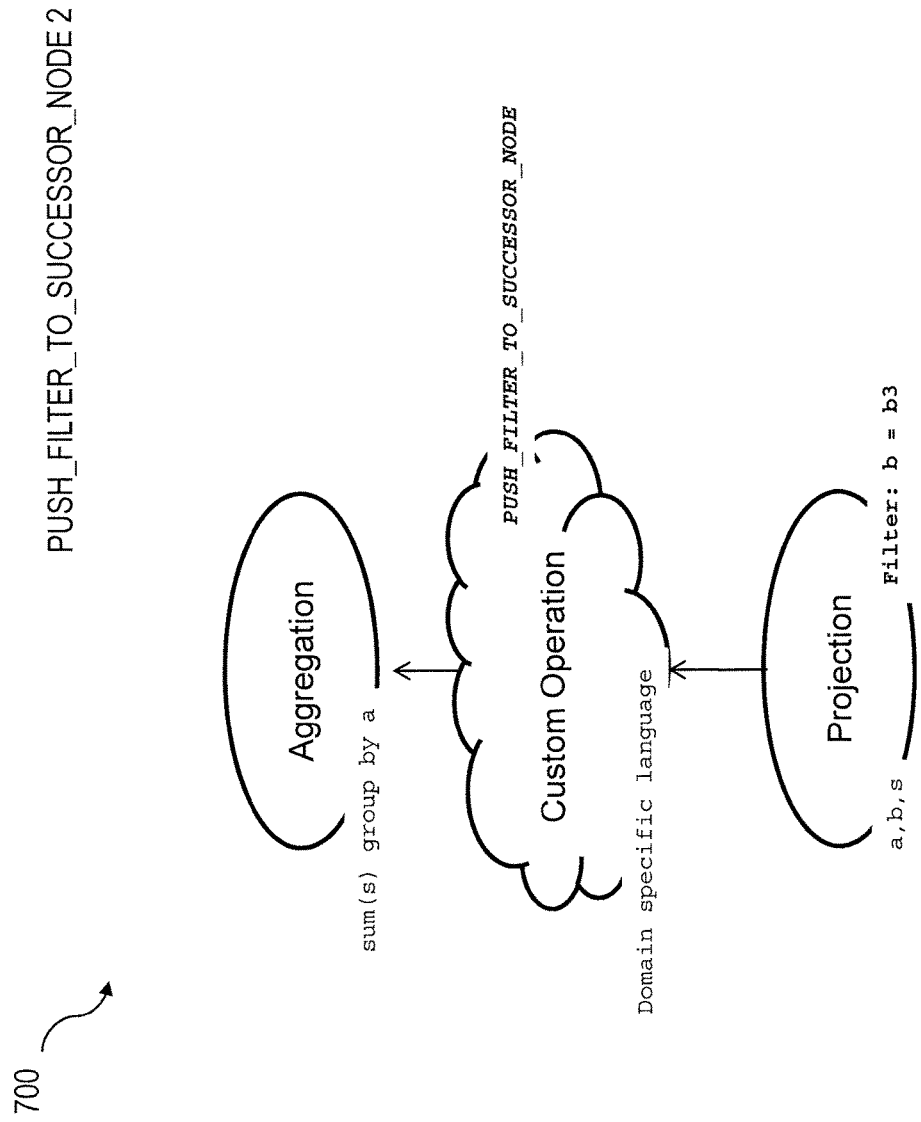
Figure 8:
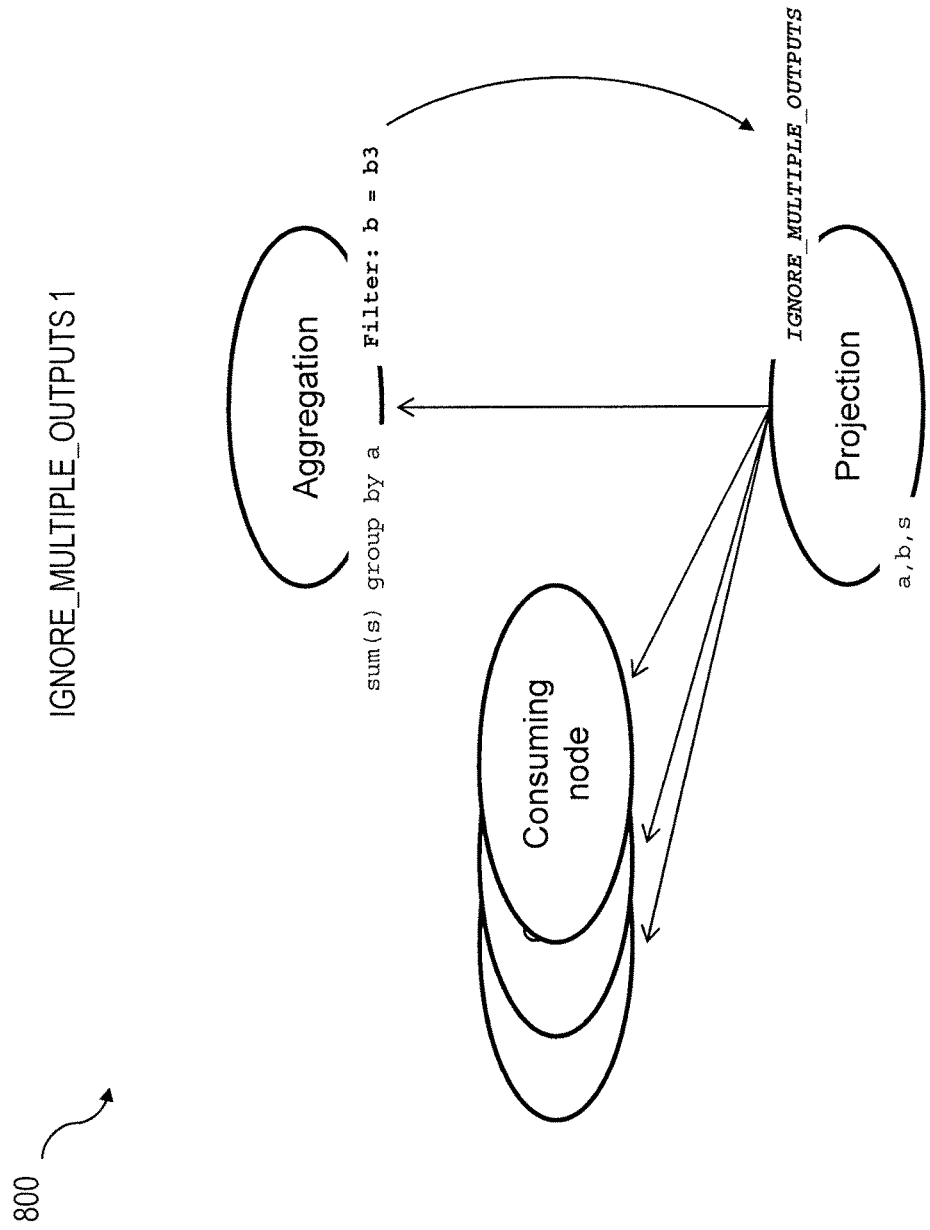
Figure 9:
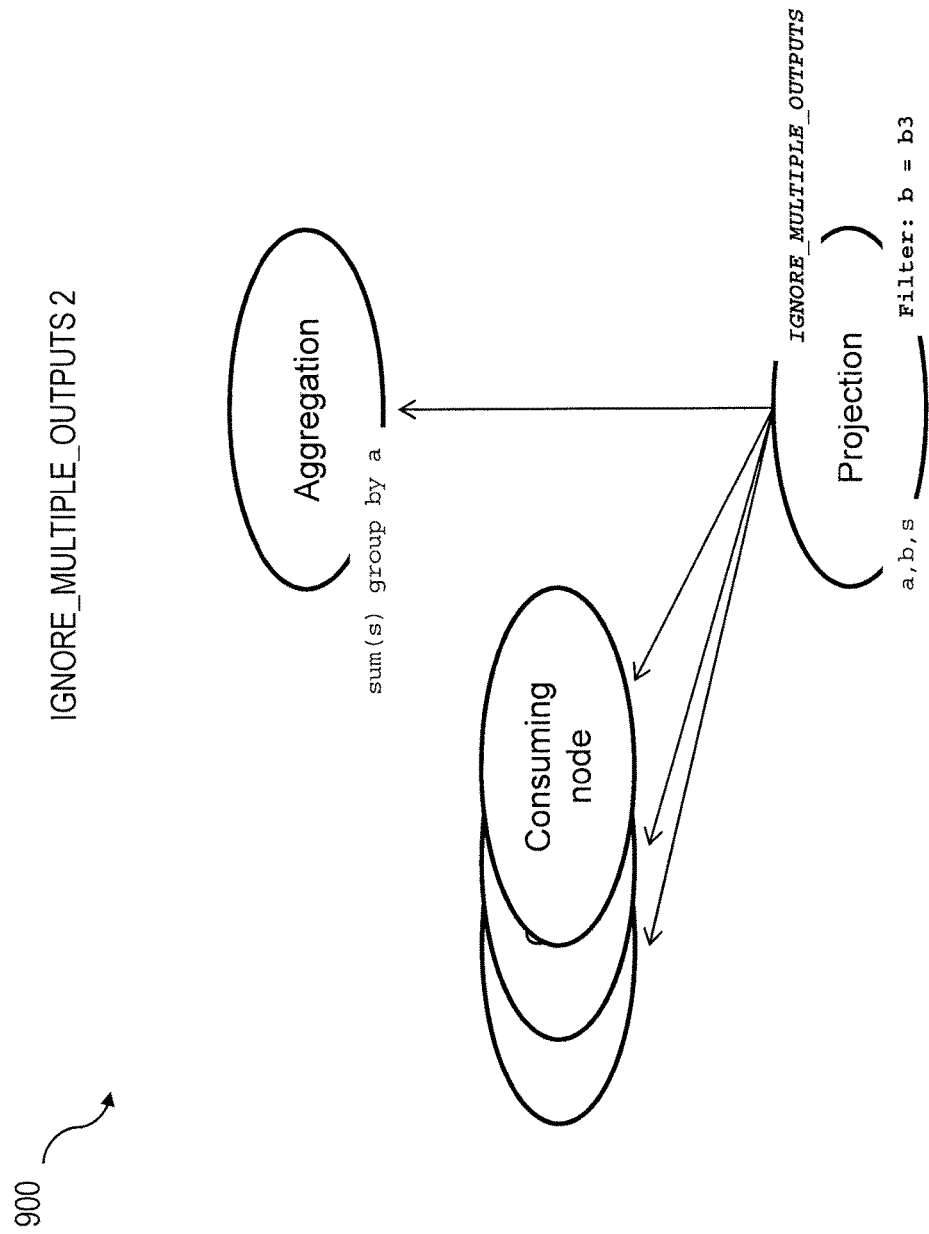

FIGS. 6-9 illustrate various data flow graphs in which hints can be utilized. The diagrams 600, 700 of FIGS. 6-7 illustrate pushing a filter through black box node (node contains domain specific language coding): PUSH_FILTER_TO_SUCCESSOR_NODE. The diagrams 700, 800 of FIGS. 7-8 illustrates pushing a filter into a node which has multiple consumers (filter will influence the input data of all consuming nodes): IGNORE_MULTIPLE_OUTPUTS.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figure(s) and described herein do not require the particular order shown, or sequential order, to achieve desirable results. Other embodiments may be within the scope of the following claims.

What is claimed is:

1. A method comprising:

receiving a query;

generating, at a calculation engine and in response to the query, a calculation scenario for executing the query on a database, the calculation scenario comprising an initial data flow graph comprising data flows between a database server and an application server and a plurality of nodes representing operations for executing the query, at least one node of the plurality of nodes comprising a set of inputs and outputs and at least one operation that transforms the inputs into the outputs;

optimizing the initial data flow graph into an optimized data flow graph, the optimizing comprising:

enriching, by a model optimizer, the initial data flow graph with a hint on one or more nodes of the plurality of nodes to provide instructions indicating an optimization to be performed at one or more unoptimized nodes within the dataflow graph hierarchy;

applying, by a rules engine of the model optimizer, a set of rules to the initial data flow graph, the set of rules comprising a first rule, the first rule defining a first optimization to the initial data flow graph and how and when to apply the first optimization;

determining, by the model optimizer, that the first rule comprises a disqualification fact that would prevent the first optimization from being completed by the model optimizer according to the first rule;

applying, by the model optimizer and based on the determining, the hint to override the disqualification fact of the first rule such that the first optimization is applied differently than indicated by the first rule;

applying, by the model optimizer and in response to the applying the hint, remaining rules of the set of rules to the initial data flow graph to create the optimized data flow graph; and initiating execution of the query on the database using the optimized data flow graph such that a hierarchy of nodes in the data flow graph, that would have remained unoptimized if the hint was not applied to override the disqualification fact of the first rule, are optimized based on a determination of whether the hint was applied.

2. A method as in claim 1, wherein applying the hint changes which calculation node implements an operation of the operations as defined in the first rule.

3. A method as in claim 1, wherein the hint specifies that the first optimization is applied to at least a portion of the plurality of calculation nodes despite an evaluation of the disqualification fact indicating that the first optimization should not be applied to the at least the portion of the plurality of calculation nodes by the model optimizer.

4. A method as in claim 1, wherein the hint comprises metadata associated with a corresponding calculation node of the plurality of calculation nodes.

5. A method as in claim 4, wherein the metadata is specified via user-generated input via a graphical user interface.

6. A method as in claim 1, wherein the receiving, optimizing and initiating are implemented by one or more data processors distributed among one or more computing systems.

7. A computer program product comprising a non-transitory machine-readable medium storing instructions that, when executed by at least one programmable processor, cause the at least one programmable processor to perform operations comprising:

receiving a query;

generating, at a calculation engine and in response to the query, a calculation scenario for executing the query on a database, the calculation scenario comprising an initial data flow graph comprising data flows between a database server and an application server and a plurality of nodes representing operations for executing the query, at least one node of the plurality of nodes comprising a set of inputs and outputs and at least one operation that transforms the inputs into the outputs;

optimizing the initial data flow graph into an optimized data flow graph, the optimizing comprising:

enriching, by a model optimizer, the initial data flow graph with a hint on one or more nodes of the plurality of nodes to provide instructions indicating an optimization to be performed at one or more unoptimized nodes within the dataflow graph hierarchy;

applying, by a rules engine of the model optimizer, a set of rules to the initial data flow graph, the set of rules comprising a first rule, the first rule defining a first optimization to the initial data flow graph and how and when to apply the first optimization;

determining, by the model optimizer, that the first rule comprises a disqualification fact that would prevent the first optimization from being completed by the model optimizer according to the first rule;

applying, by the model optimizer and based on the determining, the hint to override the disqualification fact of the first rule such that the first optimization is applied differently than indicated by the first rule;

applying, by the model optimizer and in response to the applying the hint, remaining rules of the set of rules to the initial data flow graph to create the optimized data flow graph; and initiating execution of the query on the database using the optimized data flow graph such that a hierarchy of nodes in the data flow graph, that would have remained unoptimized if the hint was not applied to override the disqualification fact of the first rule, are optimized based on a determination of whether the hint was applied.

8. A computer program product as in claim 7, wherein applying the hint changes which calculation node implements an operation of the operations as defined in the first rule.

9. A computer program product as in claim 7, wherein the hint specifies that the first optimization is applied to at least a portion of the plurality of calculation nodes despite an evaluation of the disqualification fact indicating that the first optimization should not be applied to the at least the portion of the plurality of calculation nodes by the model optimizer.

10. A computer program product as in claim 7, wherein the hint comprises metadata associated with a corresponding calculation node of the plurality of calculation nodes.

11. A computer program product as in claim 10, wherein the metadata is specified via user-generated input via a graphical user interface.

12. A system comprising:
one or more data processors; and
memory storing instructions, which when executed, cause one or more of the at least one data processor to perform operations comprising:
receiving a query;
generating, at a calculation engine and in response to the query, a calculation scenario for executing the query on a database, the calculation scenario comprising an initial data flow graph comprising data flows between a database server and an application server and a plurality of nodes representing operations for executing the query, at least one node of the plurality of nodes comprising a set of inputs and outputs and at least one operation that transforms the inputs into the outputs;
optimizing the initial data flow graph into an optimized data flow graph, the optimizing comprising:
enriching, by a model optimizer, the initial data flow graph with a hint on one or more nodes of the plurality of nodes to provide instructions indicating an optimization to be performed at one or more unoptimized nodes within the dataflow graph hierarchy;
applying, by a rules engine of the model optimizer, a set of rules to the initial data flow graph, the set of rules comprising a first rule, the first rule defining a first optimization to the initial data flow graph and how and when to apply the first optimization;
determining, by the model optimizer, that the first rule comprises a disqualification fact that would prevent the first optimization from being completed by the model optimizer according to the first rule;
applying, by the model optimizer and based on the determining, the hint to override the disqualification fact of the first rule such that the first optimization is applied differently than indicated by the first rule;
applying, by the model optimizer and in response to the applying the hint, remaining rules of the set of rules to the initial data flow graph to create the optimized data flow graph; and
initiating execution of the query on the database using the optimized data flow graph such that a hierarchy of nodes in the data flow graph, that would have remained unoptimized if the hint was not applied to override the disqualification fact of the first rule, are optimized based on a determination of whether the hint was applied.

13. A system as in claim 12, wherein applying the hint changes which calculation node implements an operation of the operations as defined in the first rule.

14. A system as in claim 12, wherein the hint specifies that the first optimization is applied to at least a portion of the plurality of calculation nodes despite an evaluation of the disqualification fact indicating that the first optimization should not be applied to the at least the portion of the plurality of calculation nodes by the model optimizer.

15. A system as in claim 12, wherein the hint comprises metadata associated with a corresponding calculation node of the plurality of calculation nodes.

16. A system as in claim 15, wherein the metadata is specified via user-generated input via a graphical user interface.

17. A method as in claim 1, wherein the query is received by a calculation engine that forms part of the database, the database comprising a calculation engine layer in which the calculation engine resides, a physical table pool comprising physical tables containing data, and a logical layer disposed between the calculation layer and the physical table pool in which tables are joined using logic metamodels.

18. A computer program product as in claim 7, wherein the query is received by a calculation engine that forms part of the database, the database comprising a calculation engine layer in which the calculation engine resides, a physical table pool comprising physical tables containing data, and a logical layer disposed between the calculation layer and the physical table pool in which tables are joined using logic metamodels.

19. A system as in claim 12, wherein the query is received by a calculation engine that forms part of the database, the database comprising a calculation engine layer in which the calculation engine resides, a physical table pool comprising physical tables containing data, and a logical layer disposed between the calculation layer and the physical table pool in which tables are joined using logic metamodels.

* * * * *